United States Patent
Englund et al.

(10) Patent No.: US 8,177,880 B2
(45) Date of Patent: *May 15, 2012

(54) SYSTEM AND METHOD OF PRODUCING METALLIC IRON

(75) Inventors: David Englund, Bovey, MN (US); Rodney Bleifuss, Grand Rapids, MN (US); Iwao Iwasaki, Grand Rapids, MN (US); Donald Fosnacht, Hermantown, MN (US); Mark Brandon, Charlotte, NC (US); Bradford True, Charlotte, NC (US)

(73) Assignee: Nu-Iron Technology, LLC, Charlotte, NC (US)

( * ) Notice: Subject to any disclaimer, the term of this patent is extended or adjusted under 35 U.S.C. 154(b) by 232 days.

This patent is subject to a terminal disclaimer.

(21) Appl. No.: 12/444,505

(22) PCT Filed: Oct. 4, 2007

(86) PCT No.: PCT/US2007/080362
§ 371 (c)(1),
(2), (4) Date: Apr. 6, 2009

(87) PCT Pub. No.: WO2008/042996
PCT Pub. Date: Apr. 10, 2008

(65) Prior Publication Data
US 2010/0031776 A1    Feb. 11, 2010

Related U.S. Application Data

(60) Provisional application No. 60/828,170, filed on Oct. 4, 2006.

(51) Int. Cl.
*C21B 11/08*    (2006.01)

(52) U.S. Cl. .......................................... 75/484; 75/503
(58) Field of Classification Search ................... 75/484, 75/503
See application file for complete search history.

(56) References Cited

U.S. PATENT DOCUMENTS

| | | | |
|---|---|---|---|
| 5,989,019 A * | 11/1999 | Nishimura et al. | 432/138 |
| 6,135,766 A | 10/2000 | Takeda et al. | |
| 6,258,149 B1 * | 7/2001 | Sugiyama et al. | 75/484 |

(Continued)

FOREIGN PATENT DOCUMENTS

DE    3215209    11/1983
(Continued)

*Primary Examiner* — George Wyszomierski
*Assistant Examiner* — Tima M McGuthry Banks
(74) *Attorney, Agent, or Firm* — Hahn, Loeser & Parks, LLP; Arland T. Stein

(57) ABSTRACT

A hearth furnace 10 for producing metallic iron material has a furnace housing 11 with a drying/preheat zone 12 capable of providing a drying/preheat atmosphere for reducible material, a conversion zone 13 capable of providing a reducing atmosphere for reducible material, a fusion zone 14 capable of providing an atmosphere to at least partially reduced metallic iron material, and optionally a cooling zone 15 capable of providing a cooling atmosphere for reduced material containing metallic iron material. A hearth 20 is movable within the furnace housing 11 in a direction through the drying/preheat zone 12, then the conversion zone 13, then the fusion zone 14, and then the cooling zone 15. A separation barrier 30 is positioned within at least a portion of the conversion zone 13, the separation barrier 30 separating the conversion zone 13 into a combustion region 32 and a reducing region 31 with the reducing region 31 adjacent the hearth 20 and the combustion region 32 adjacent the reducing region 31 and spaced from the hearth 20.

7 Claims, 8 Drawing Sheets

U.S. PATENT DOCUMENTS

| | | |
|---|---|---|
| 6,390,810 B1 | 5/2002 | Rinker et al. |
| 6,413,295 B2 | 7/2002 | Meissner et al. |
| 2003/0047038 A1* | 3/2003 | Iwasaki et al. ............... 75/707 |
| 2004/0076539 A1* | 4/2004 | Ito et al. ............... 420/13 |
| 2004/0173054 A1 | 9/2004 | Tsuge et al. |
| 2005/0229748 A1* | 10/2005 | Bleifuss et al. ............... 75/483 |
| 2009/0229414 A1* | 9/2009 | Bleifuss et al. ............... 75/484 |

FOREIGN PATENT DOCUMENTS

| | | |
|---|---|---|
| EP | 0924304 | 6/1999 |
| EP | 0952230 | 10/1999 |
| EP | 1357195 | 10/2003 |
| FR | 1557112 | 2/1969 |

* cited by examiner

SYSTEM AND METHOD OF PRODUCING METALLIC IRON

CROSS-REFERENCE TO RELATED APPLICATIONS

This application is the U.S. national phase of International Patent Application No. PCT/US2007/080362, which was filed on 4 Oct. 2007 and claims the benefit of U.S. Provisional Patent Application No. 60/828,172, which was filed on 4 Oct. 2006, the disclosures of which are both incorporated by reference.

BACKGROUND OF THE INVENTION

This invention relates generally to a system and method for producing metallic iron by thermally reducing a metal oxide in a moving hearth furnace.

Metallic iron has been produced by reducing iron oxide such as iron ores, iron pellets and other iron sources. Various such methods have been proposed so far for directly producing metallic iron from iron ores or iron oxide pellets by using reducing agents such as coal or other carbonaceous material.

These processes have been carried out in rotary hearth and linear hearth furnaces. An example of such a rotary hearth furnace is described in U.S. Pat. No. 3,443,931. An example of such a linear hearth furnace is described in US 2005/0229748. Both the rotary hearth furnace and the linear hearth furnace involve making mixtures of carbonaceous material with iron ore or other iron oxide fines into balls, briquettes or other compacts, and heating them on a moving hearth furnace to reduce the iron oxide to metallic iron nuggets and slag.

A limitation of these furnaces, and the methods of operating these furnaces, in the past has been their energy efficiency. The iron oxide bearing material and associated carbonaceous material generally had to be heated in the furnace to about 2500° F. (1370° C.), or higher, to reduce the iron oxide and produce metallic iron material. The furnace generally required natural gas or coal to be burned to produce the heat necessary to heat the iron oxide bearing material and associated carbonaceous material to the high temperatures to reduce the iron oxide and produce a metallic iron material. Furthermore, the reduction process involved production of volatiles in the furnace that had to removed from the furnace and secondarily combusted to avoid an environmental hazard, which added to the energy needs to perform the iron reduction. See, e.g., U.S. Pat. No. 6,390,810. What has been needed is a furnace that reduces the energy consumption needed to reduce the iron oxide bearing material such that a large part, if not all, of the energy to heat the iron oxide bearing material to the temperature necessary to cause the iron oxide to be reduced to metallic iron and slag comes from combusting volatiles directly in the furnace itself and otherwise using heat generated in one part of the furnace in another part of the furnace.

SUMMARY OF THE INVENTION

A hearth furnace for producing metallic iron material is disclosed that comprises:

(a) a furnace housing having a drying/preheat zone capable of providing a drying/preheat atmosphere for reducible material, a conversion zone capable of providing a reducing atmosphere for reducible material, a fusion zone capable of providing an atmosphere to at least partially reduced metallic iron material, and optionally a cooling zone capable of providing a cooling atmosphere for reduced material containing metallic iron material, the conversion zone being positioned between the drying/preheat zone and the fusion zone, (b) a hearth capable of being movable within the furnace housing in a direction through the drying/preheat zone, then the conversion zone, then the fusion zone, and then, if present, the cooling zone, and (c) a separation barrier within at least a portion of the conversion zone, the separation barrier separating the conversion zone into a combustion region and a reducing region with the reducing region adjacent the hearth and the combustion region adjacent the reducing region and spaced from the hearth.

The separation barrier may be positioned above the reducing region and below the combustion region. The separation barrier may ascend upwardly in the direction of movement of the hearth in an angular inclined manner or in a series of ascending steps. The separation barrier may be solid with gaps, perforated or otherwise discontinuous for the reasons described below. The separation barrier may be comprised of a heat conductive material capable of conducting heat from the combustion region to the reducing region of the conversion zone, or comprised of material capable of absorbing heat from the combustion region and radiating heat into the reducing region of the combustion zone. The separation barrier may have at least one gap to enable fluid flow between the reducing region and the combustion region of the conversion zone, and/or the separation barrier may be at least partially perforated or otherwise be provided with apertures to enable fluid flow between the reducing region and the combustion region of the conversion zone.

Alternatively, the separation barrier may be comprised of a gas curtain. In these embodiments, the gas curtain may be formed by a lateral flow of gas transverse the direction of travel of the moveable hearth through the furnace. The gas flow forming the separation barrier may be in a closed loop, and recirculated, with some gas addition, to continuously form the gas curtain. The gas curtain may be formed by an angled upward flow of gas from opposite side walls of the furnace transverse the direction of travel of the moveable hearth through the furnace. Here, the gas curtain may be formed by flow from oxy-fuel burners. In any case, the gas curtain forming the separation barrier may be comprised of a gas selected from the group consisting of nitrogen, carbon monoxide, combustion gas, effluent gas from the furnace, or a mixture of two or more of these gases.

The hearth furnace for producing metallic iron material may be further comprised of (i) a first baffle capable of inhibiting direct fluid communication from the atmosphere of the conversion zone to the atmosphere of the drying/preheat zone, (ii) a second baffle capable of at least partially inhibiting direct fluid communication from the atmosphere of at least part of the fusion zone to the atmosphere of the conversion zone, (iii) a first communication passageway capable of carrying fluid from the atmosphere of the combustion region of the conversion zone to the atmosphere of the drying/preheat zone adjacent the first baffle, and (iv) a second communication passageway capable of carrying fluid from the atmosphere of the fusion zone downstream of the second baffle to the atmosphere of the combustion region of the conversion zone adjacent the first baffle. The second baffle may be positioned between the conversion zone and the fusion zone, or may be positioned in the fusion zone so that the atmosphere of a part of the fusion zone is in direct communication with the conversion zone.

In some embodiments, the separation barrier may have a gap adjacent the second baffle, and in other embodiments, the separation barrier may have an intermediate gap and extend to the second baffle. In any case, the inlet or inlets to the first communication passageway is expected to be positioned in a location or locations that provide for efficient removal of the combusted volatiles from the combustion region of the conversion zone. For this reason, when the separation barrier extends to the second baffle, the inlet to the first communication passageway is positioned adjacent the second baffle in the combustion region. There may also be a weir contiguous with the separation barrier adjacent the intermediate gap capable of inhibiting direct communication of fluidized volatile material from the reducing region into the combustion region adjacent the second baffle, while allowing such fluidized volatile material to flow over the weir into the combustion region adjacent the second baffle. Where the gap is adjacent the second baffle, the flow of fluidized volatile material in the reducing region is concurrent with the direction of travel of the hearth through the furnace housing, and the flow of the fluidized volatile material in the combustion region is a direction countercurrent to the direction of travel of the hearth through the furnace housing. Where the gap is intermediately positioned and the separation barrier extends to the second baffle, the flow of the fluidized volatile material through the forepart of the reducing region, through the gap, and through the latter part of the combustion region is in an "S" flow.

A temperature controller may be positioned in the first communication passageway capable of controlling the temperature of fluid flowing from the atmosphere of the combustion region of the conversion zone to the drying/preheat zone. The temperature controller may mix a cooling gas, such as ambient air or nitrogen, with the fluid flow to reduce and control the temperature of fluid flow to the drying/preheat zone. Alternatively, a heat exchanger may be positioned in the first communication passageway capable of controlling the temperature of fluid flowing from the atmosphere of the combustion region of the conversion zone to the atmosphere of the drying/preheat zone, and capable of recovering heat from the fluid flow in the first communication passageway. Where a heat exchanger is provided, a heater may be provided capable of heating gas supplied to burners combusting fluid in the combustion region of conversion zone and/or the fusion zone, using in part the heat recovered by the heat exchanger.

Alternatively, the hearth furnace for producing metallic iron material may be further comprised of (i) providing a first baffle capable of inhibiting direct fluid communication between the atmospheres of the drying/preheat zone and the conversion zone, (ii) positioning the separation barrier spaced from the first baffle where volatilizable materials associated with the reducible material is more likely to fluidize in the area between the first baffle and the separation barrier, (iii) providing a first weir positioned contiguous the separation barrier capable of inhibiting direct fluid communication between the atmosphere of the conversion zone not covered by the separation barrier and the atmosphere of the combustion region adjacent at least a portion of the separation barrier, while allowing fluidized volatile material to flow over the first weir, (iv) providing a second weir positioned contiguous the separation barrier capable of inhibiting direct fluid communication between the atmosphere of the fusion zone not covered by the separation barrier and the atmosphere of the combustion region adjacent at least a portion of the separation barrier, while allowing fluid to flow over the second weir into the combustion region, and (v) providing a first communication passageway capable of carrying fluid from the atmosphere of the combustion region of the conversion zone between the first and second weirs to the atmosphere of the drying/preheat zone adjacent the first baffle.

In another alternative embodiment, the hearth furnace for producing metallic iron material may be further comprised of (i) a first baffle capable of inhibiting direct fluid communication between the atmospheres of the drying/preheat zone and the conversion zone, (ii) positioning the separation barrier spaced from the first baffle where volatilizable material associated with the reducible material is more likely to fluidize in an area between the first baffle and the separation barrier, (iii) a first weir positioned contiguous the separation barrier capable of inhibiting direct fluid communication between the atmosphere of the conversion zone not covered by the separation barrier and the atmosphere of the combustion region adjacent at least a portion of the separation barrier, while allowing fluidized volatile material to flow over the first weir, (iv) a second baffle contiguous the separation barrier capable of blocking direct fluid communication between the atmosphere of the fusion zone not covered by the separation barrier and the atmosphere of the combustion region adjacent at least a portion of the separation barrier, and (v) a first communication passageway capable of carrying fluid from the atmosphere of the combustion region of the conversion zone between the first weir and the second baffle to the atmosphere of the drying/preheat zone adjacent the first baffle.

In yet another alternative embodiment, the hearth furnace for producing metallic iron material may be further comprised of (i) a first baffle capable of inhibiting direct fluid communication between the atmosphere of the drying/preheat zone and the conversion zone, (ii) positioning the separation barrier spaced from the first baffle where volatilizable materials associated with the reducible material are most likely to fluidize in an area between the first baffle and the separation barrier, (iii) a first weir positioned contiguous the separation barrier capable of inhibiting direct fluid communication between the atmosphere of the conversion zone not covered by the separation barrier and the atmosphere of the combustion region adjacent at least a portion of the separation barrier, while allowing fluidized volatile material to flow over the first weir, (iv) a second weir positioned contiguous the separation barrier capable of inhibiting direct fluid communication between the atmosphere of the fusion zone not covered by the separation barrier and the atmosphere of the combustion region adjacent at least a portion of the separation barrier, while allowing fluidized volatile material to flow over the second weir into the combustion region, (v) where extensions of the first and second weirs extend toward each other to form a partially enclosed volume of a portion of the combustion region adjacent the separation barrier with an opening through which fluidized volatile material from the conversion zone and the fusion zone can flow into said enclosed volume, and (iv) a communicating passageway capable of carrying fluid from the enclosed volume of the combustion region of the conversion zone to the atmosphere of the drying/preheat zone adjacent the first baffle.

The hearth furnace for producing metallic iron material may be further comprised of a third baffle capable of inhibiting direct fluid communication between the atmosphere of at least part of the cooling zone and at least part of the fusion zone. Also, a third communication passageway may be provided capable of carrying fluid from the atmosphere of the cooling zone adjacent the third baffle to the atmosphere of the drying/preheat zone adjacent the first baffle.

The moveable hearth of the hearth furnace may have a linear hearth or a rotary hearth.

In addition, a method of reducing iron ore and other iron oxide sources is disclosed comprised of:

(a) forming a furnace housing having a drying/preheat zone with a drying/preheat atmosphere, and a conversion zone with a reducing atmosphere for reducing reducible material, (b) providing a hearth in the furnace housing moveable in a direction through the drying/preheat zone and then the conversion zone, (c) providing a separation barrier within at least a portion of the conversion zone separating the conversion zone into a combustion region and a reducing region with the reducing region adjacent the hearth and the combustion region adjacent the reducing region and spaced from the hearth, (d) moving the hearth containing iron oxide bearing material and carbonaceous material in the furnace housing through the drying/preheat zone to dry and preheat the iron oxide bearing material and carbonaceous material, and then through the reducing region of the conversion zone to heat the iron oxide bearing material and carbonaceous material, fluidizing volatile material from the iron oxide bearing material and carbonaceous material, and at least partially reducing the iron oxide bearing material, (e) causing fluidized volatile material from the iron oxide bearing material and carbonaceous material in the atmosphere of the reducing region of the conversion zone to flow into the atmosphere of the combustion region of the conversion zone, and (f) combusting the fluidized volatile material in the combustion region of the conversion zone to assist in heating the iron oxide bearing material and carbonaceous material in the reducing region of the conversion zone.

The method of reducing iron ore and other iron oxide sources may be further comprised of the step of causing flow of fluid through the atmosphere of the combustion region of the conversion zone in a direction concurrent to the direction of the movement of the hearth, and of fluid at least part way through the atmosphere of the reducing region of the conversion zone in a direction concurrent to the movement of the hearth. Alternatively, the method of reducing iron ore and other iron oxide sources may be further comprised of the step of causing flow of fluid at least part way through the atmosphere of the combustion region of the conversion zone in a direction counter to the direction of the movement of the hearth, and of fluid at least part way through the atmosphere of the reducing region of the conversion zone in a direction concurrent to the movement of the hearth.

In any case, this step may be accomplished by providing one or more gaps in and/or adjacent the separation barrier to facilitate flow of fluid from the atmosphere of the reducing region to the atmosphere of the combustion region of the conversion zone. Additionally or alternatively, this step may be accomplished by providing perforations, apertures or other discontinuities in the separation barrier to facilitate the flow of fluid from the atmosphere of the reducing region to the atmosphere of the combustion region of the conversion zone.

The method of reducing iron ore and other iron oxide sources may be further comprised of the steps causing fluid from the atmosphere of the combustion region of the conversion zone to flow through a first communication passageway from the atmosphere of the combustion region of the conversion zone to the drying/preheat zone, and causing fluid from the atmosphere of the fusion zone to flow through a second communication passageway to the atmosphere of the combustion region of the conversion zone adjacent the drying/preheat zone.

More specifically, the method of reducing iron ore and other iron oxide sources may be further comprised of (i) positioning a first baffle between the atmosphere of the drying/preheat zone and the conversion zone inhibiting direct fluid communication between the atmospheres of the drying/preheat zone and the conversion zone, (ii) positioning a second baffle in the atmosphere of the fusion zone or between the atmosphere of the fusion zone and the conversion zone inhibiting direct fluid communication between the atmospheres of the fusion zone downstream of the second baffle and the conversion zone, (iii) causing fluid to flow through a passageway from the atmosphere of the combustion region of the conversion zone to the atmosphere of the drying/preheat zone adjacent the first baffle, and (iv) causing fluid to flow through a passageway from the atmosphere of at least part of the fusion zone downstream of the second baffle to the atmosphere of the combustion region of the conversion zone adjacent the first baffle.

The method of reducing iron ore and other iron oxide sources may be further comprised of regulating the temperature of fluid flowing through the communication passageway from the atmosphere of the combustion region of the conversion zone to the atmosphere of the drying/preheat zone, by mixing the fluid flow with a cooling gas such as ambient air or nitrogen. Alternatively, the method of reducing iron ore and other iron oxide sources may be further comprised of removing heat from the fluid flow through the communication passageway from the atmosphere of the combustion region of the conversion zone to the atmosphere of the drying/preheat zone, and using the heat removed from the fluid flow through said communication passageway to heat gas supplied to burners combusting fluid in the combustion region of the conversion zone.

The carbonaceous material may be selected from the group consisting of coke, char and other carbon containing materials.

The method of reducing iron ore and other iron oxide sources may be further comprised of forming a hearth layer of carbonaceous material on the movable hearth, on which mixtures of the iron oxide bearing material and the carbonaceous material is positioned in preformed or in situ formed discrete portions.

Alternatively, the disclosed method of reducing iron ore and other iron oxide sources may be comprised of:

(a) forming a furnace housing having a drying/preheat zone capable of providing a drying/preheat atmosphere for reducible material, a conversion zone capable of providing a reducing atmosphere for reducible material, a fusion zone capable of providing an atmosphere to at least partially reduced metallic iron material, and optionally a cooling zone capable of providing a cooling atmosphere for reduced material containing metallic iron material, the conversion zone being positioned between the drying/preheat zone and the fusion zone, (b) providing a hearth in the furnace housing moveable through the drying/preheat zone, then the conversion zone, then the fusion zone, and then if present the cooling zone, (c) providing a separation barrier within at least a portion of the conversion zone separating the atmospheres of the conversion zone into a combustion region and a reducing region of the conversion zone, with the reducing region adjacent the hearth and the combustion region adjacent the reducing region and spaced from the hearth, (d) moving the hearth containing iron oxide bearing material and carbonaceous material in the furnace housing through the drying/preheat zone to dry and preheat the iron oxide bearing material and carbonaceous material, then through the reducing region of the conversion zone to heat the iron oxide bearing material and carbonaceous material to fluidize volatile material from the iron oxide bearing material and carbonaceous material and at least partially reduce the iron oxide bearing material, then through a fusion zone to fuse the reduced iron oxide bearing material to metallic iron material, and then if present through the cooling zone to cool the metallic iron material, (e) causing fluidized volatile material from the iron oxide bearing material and carbonaceous material in the atmosphere of the reducing region of the conversion region to flow into the atmosphere of the combustion region of the conversion zone, and (f) combusting said fluidized volatile material in the atmosphere of the combustion region of the conversion zone to at least partially heat the iron oxide bearing material and carbonaceous material in the reducing region of the conversion zone.

The method of reducing iron ore and other iron oxide sources may be further comprised of positioning a third baffle inhibiting direct fluid communication between the atmosphere of at least part of the cooling zone and at least part of the fusion zone, and causing fluid to flow through a communication passageway from the atmosphere of at least part of the cooling zone downstream of the third baffle to the atmosphere of the drying/preheat zone adjacent the first baffle.

The method of producing metallic iron material may involve movement of the hearth linearly at least through the reducing region of the conversion zone. Alternatively, the method of producing metallic iron material may involve the movement of the hearth in a rotary furnace.

Alternatively, the method of reducing iron ore and other iron oxide sources may be further comprised of (i) positioning the separation barrier within a portion of the conversion zone spaced from the drying/preheat zone where the volatilizable material associated with the reducible material is most likely to fluidize between the drying/preheat zone and the separation barrier, (ii) forming a first weir contiguous with the separation barrier capable of inhibiting direct fluid communication between the atmosphere of the conversion zone not covered by the separation barrier adjacent the drying/preheat zone and the atmosphere of the combustion region of the conversion zone adjacent at least a portion of the separation barrier, while allowing fluidized volatile material to flow over the first weir, (iii) forming a second weir contiguous with the separation barrier capable of inhibiting direct fluid communication between the atmosphere of the fusion zone not covered by the separation barrier and the atmosphere of the combustion region adjacent at least a portion of the separation barrier, while allowing fluidized volatile material to flow over the second weir into the combustion region, (iv) combusting fluidized volatile material in the combustion region between the first and second weirs in the conversion zone to assist in heating the reducible material in the reducing region, and (v) causing fluid to flow through a communication passageway from the atmosphere of the combustion region of the conversion zone between the first and second weirs to the atmosphere of the drying/preheat zone.

Alternatively, the method of reducing iron ore and other iron oxide sources may be further comprised of (i) positioning the separation barrier within a portion of the conversion zone spaced from the drying/preheat zone where volatilization of materials associated with the reducible material is most likely to fluidize between the drying/preheat zone and the separation barrier, (ii) forming a first weir contiguous with the separation barrier capable of inhibiting direct fluid communication between the atmosphere of the conversion zone not covered by the separation barrier and the atmosphere of the combustion region adjacent at least a portion of the separation barrier, while allowing fluidized volatile material to flow over the first weir, (iii) forming a second weir contiguous with the separation barrier capable of inhibiting direct fluid communication between the atmosphere of the fusion zone not covered by the separation barrier and the atmosphere of the combustion region adjacent at least a portion of the separation barrier, while allowing fluidized volatile material to flow over the second weir into the combustion region, (iv) extending the upper portions of the first weir and second weir toward each other to form a partially enclosed volume of a portion of the combustion region above the separation barrier, with an opening therein through which fluid from the conversion zone and the fusion zone can flow into said enclosed volume, (v) combusting fluidized volatile material in the combustion region adjacent said opening to assist in heating the reducible material in the reducing region, and (iv) causing fluid to flow through a communicating passageway from said enclosed volume to the atmosphere of the drying/preheat zone.

In another alternative embodiment, the method of reducing iron ore and other iron oxide sources may be further comprised of (i) positioning the separation barrier spaced from the first baffle where volatilizable material associated with the reducible material is more likely to fluidize in an area between the first baffle and the separation barrier, (ii) providing a first baffle capable of inhibiting direct fluid communication between the atmospheres of the drying/preheat zone and the conversion zone, (iii) providing a first weir contiguous with the separation barrier capable of inhibiting direct fluid communication between the atmosphere of the conversion zone not covered by the separation barrier and the atmosphere of the combustion region adjacent at least a portion of the separation barrier, while allowing fluidized volatile material to flow over the first weir, (iv) positioning a second baffle contiguous with the separation barrier blocking direct fluid communication between the atmosphere of the fusion zone not covered by the separation barrier and the atmosphere of the combustion region adjacent at least a portion of the separation barrier, and (v) causing fluid to flow through a communication passageway from the atmosphere of the combustion region of the conversion zone between the first weir and the second baffle to the atmosphere of the drying/preheat zone adjacent the first baffle.

Also disclosed in a method of producing metallic iron material, the steps comprising:

(a) forming a furnace housing having a drying/preheat zone with a drying/preheat atmosphere for reducing material, a conversion zone with an atmosphere for at least partially reducing material, a fusion zone for forming reducible material at least partially into metallic iron material and slag, and a cooling zone with a cooling atmosphere for cooling reduced metallic iron material;

(b) providing a hearth capable of being movable in the furnace housing, (c) providing a separation barrier within at least a portion of the atmosphere of the conversion zone, the separation barrier separating the conversion zone into a reducing region adjacent the hearth and a combustion region an adjacent the reducing region and spaced from the hearth, and (d) moving the hearth with a reducible material thereon in the furnace housing through the drying/preheat zone, then through the reducing region of the conversion zone, then through the fusion zone, and then through the cooling zone to produce metallic iron material.

The separation barrier may be positioned above the reducing region and below the combustion region. The separation barrier may ascend upwardly in the direction of movement of the hearth, either in an angular form or in ascending steps. The separation barrier may be formed with a first end adjacent the drying/preheat zone and a second end adjacent the fusion zone, and at least one gap enabling fluid flow between the atmospheres of the reducing region of the conversion zone and the combustion region of the conversion zone.

In the method producing metallic iron material, fluid may be caused to flow at least part way through the atmosphere of the reducing region of the conversion zone in a direction concurrent with the movement of the hearth and into the atmosphere of the combustion region of the conversion zone, and to flow at least part way through the combustion region of the conversion zone in a direction counter to the direction of movement of the hearth.

In the method of producing metallic iron material, the movement of the hearth may be linear at least through the reducing region of the conversion zone. Alternatively, the movement of the hearth is rotary through the furnace.

Also disclosed in a method for reducing iron oxide to produce metallic iron material are the steps of:

(a) providing a furnace having a moving hearth and a separation barrier dividing a part of the atmosphere of the furnace into a reducing region adjacent the moving hearth and a combustion region adjacent the reducing region and spaced from hearth, (b) placing at least a reducible layer of mixed iron oxide and carbonaceous material on the moving hearth, (c) moving the reducible layer of mixed iron oxide and carbonaceous material on the moving hearth into the reducing region, (d) heating the reducible layer of mixed iron oxide and carbonaceous material in the reducing region to produce fluidized volatile material in the atmosphere of the reducing region of the conversion zone, (e) causing the fluidized volatile material to flow from the atmosphere of the reducing region into the atmosphere of the combustion region, and (f) burning the fluidized volatile material in the combustion region to at least partially heat the reducible layer in the reducing region.

In the method for reducing iron oxide to produce metallic iron material, the method steps may further comprise causing a flow of fluid in at least a part of the atmosphere of the reducing region in the direction of travel of the moving hearth, and causing a flow of fluid in at least a part of the atmosphere of the combustion region in a direction counter to the direction of travel of the moving hearth.

In the method for reducing iron oxide to produce metallic iron material may further comprise the step of placing a layer of carbonaceous material on the moving hearth below the reducible layer containing a mixture of iron oxide and carbonaceous material. In addition, the method may further comprise placing an overlayer of coarse carbonaceous material as described in U.S. application Ser. No. 60/820,366, filed Jul. 26, 2006, which is incorporated herein by reference.

DETAILED DESCRIPTION OF THE DRAWINGS

Figure 1:
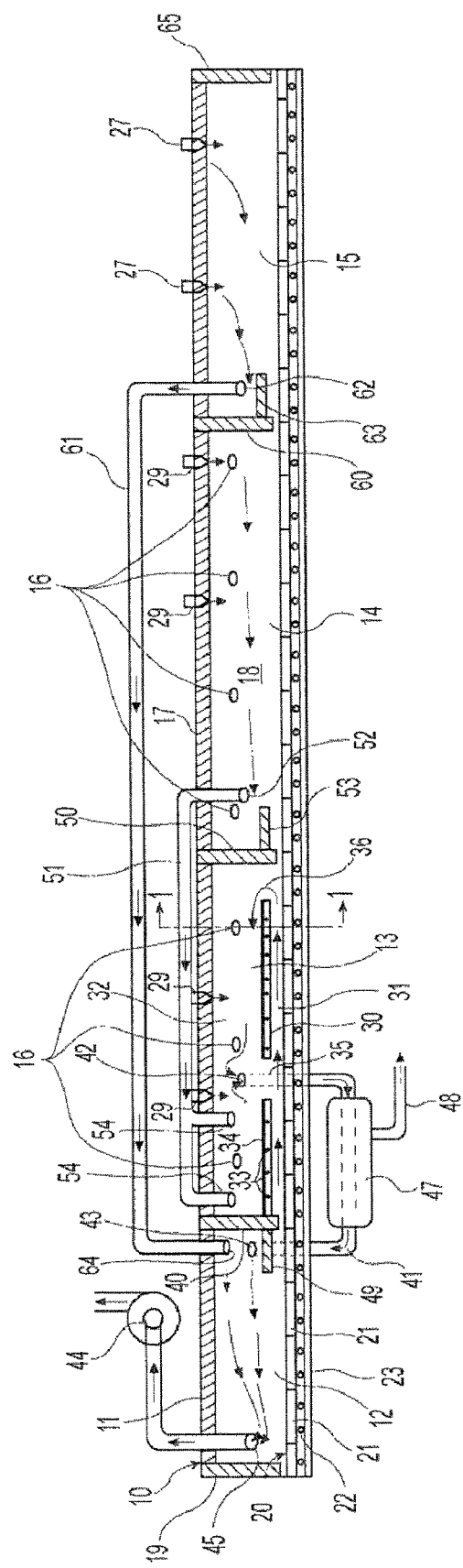
FIG. 1 is an elevation view illustrating a hearth furnace for producing metallic iron material and a method for producing same.

Referring to FIG. 1, a hearth furnace 10 for producing metallic iron material directly from iron ore and other iron oxide sources is shown. The furnace 10 has a furnace housing 11 internally lined with a refractory material suitable to withstand the temperatures involved in the metallic reduction process carried out in the furnace. The hearth furnace 10 is divided into a drying/heating zone 12 capable of providing a drying/preheating atmosphere for reducible material, a conversion zone 13 capable of providing a reducing atmosphere for reducible material, a fusion zone 14 capable of providing an atmosphere to at least partially form metallic iron material, and optionally a cooling zone 15 capable of providing a cooling atmosphere for reduced material containing metallic iron material. The conversion zone 13 is positioned between the drying/preheat zone 12 and the fusion zone 14. The conversion zone 13 is the zone in which volatiles from the reducible material, including carbonaceous material, is fluidized, as well as the zone in which at least the initial reduction of metallic iron material occurs. The entry end of the hearth furnace 10, at the drying/preheat zone 12, is closed by a restricting baffle 19 that inhibits fluid flow between the outside ambient atmosphere and the atmosphere of the drying/preheat zone 12, yet provides clearance so as not to inhibit the movement of reducible material into the furnace housing 11. The baffle 19 may be made of suitable refractory material or a metal material if the temperatures are sufficiently low.

Hearth 20 provided within the furnace housing 11 may be comprised of a series of movable hearth cars 21, which are positioned contiguously end to end as they move through the furnace housing 11. Hearth cars 21 are moved on wheels 22 which typically engage railroad rails 23. The upper portion of the hearth cars 21 are lined with a refractory material suitable to withstand the temperatures for reduction of the iron oxide bearing material into metallic iron as explained herein. The hearth cars are positioned contiguously end to end to move through the furnace housing 11, so that the lower portions of the hearth cars are not damaged by the heat generated in the furnace as the process of reducing iron oxide-bearing material into metallic iron proceeds. Alternatively, the hearth 20 may be movement belt or other suitable conveyance medium that with the refractory material described below, is able to within the temperatures of the furnace atmospheres as described below.

The reducible material is positioned on the hearth cars 21 outside the furnace generally in the form of a mixture of finely divided iron ore, or other iron oxide bearing material, and a carbonaceous material, such as coke, char, anthracite coal or non-caking bituminous and sub-bituminous coal. The reducible material is in mixtures of finely divided iron oxide-bearing material that are formed into compacts. The compacts may be briquettes or mounds preformed or formed in situ on the hearth cars 21 so that the mixtures of reducible material are presented to the furnace 10 in discrete portions. Also, a hearth layer of finely divided carbonaceous material, such as coke, char or coal, may be provided on the hearth cars with the reducible material positioned on the hearth layer, to avoid damage to the refractory material used in the upper portion of the hearth cars 21 from the related slag generated on reducing the metallic iron in the furnace.

The hearth furnace may be linear as generally illustrated in FIG. 1. In this connection, the building in which the furnace is housed, or other considerations, may require that certain parts of the furnace be arcuate or at angles, to accommodate these needs. For these purposes, the hearth furnace is classified as linear if a part of its length, usually the conversion zone 13, is substantially linear in the direction of travel of the hearth 20. The hearth furnace may also be rotary, in which case the hearth cars are pie-shaped or in the form of replaceable sections of a contiguous hearth.

The zones of the furnace 10 are generally characterized by the temperature reached in each zone. In the drying/preheat zone, moisture is generally driven off from the reducible material and the reducible material is heated to a temperature short of fluidizing volatiles in and associated with the reducible material positioned on the hearth cars 21. The design is to reach in the drying/preheat atmosphere a cut-off temperature in the reducible material just short of significant volatilization of carbonaceous material in and associated with the reducible material. This temperature is generally somewhere in the range of about 300-600° F. (150-315° C.), depending in part on the particular composition of the reducible material.

The conversion zone 13 is characterized by heating the reducible material first to drive off remaining the moisture and most of the volatiles in the reducible material, and then to initiate the reduction process in forming the reducible material into metallic iron material and slag. The conversion zone 13 is generally characterized by heating the reducible material to about 1500 to 2100° F. (815 to 1150° C.), depending on the particular composition and form of reducible material.

The fusion zone 14 involves further heating the reducible material, now absent of most volatile materials and commencing to form metallic iron, to fuse the metallic iron material and separate slag. The fusion zone generally involves heating the reducible material to about 2400 to 2550° F. (1315-1370° C.), or higher, so that metallic iron nuggets are formed with only a low percentage of iron oxide in the metallic iron. If the process is carried out efficiently, there will also be a low percentage of iron oxide in the slag, since the process is designed to reduce very high percentage of the iron oxide in the reducible material to metallic iron.

Figure 1C:
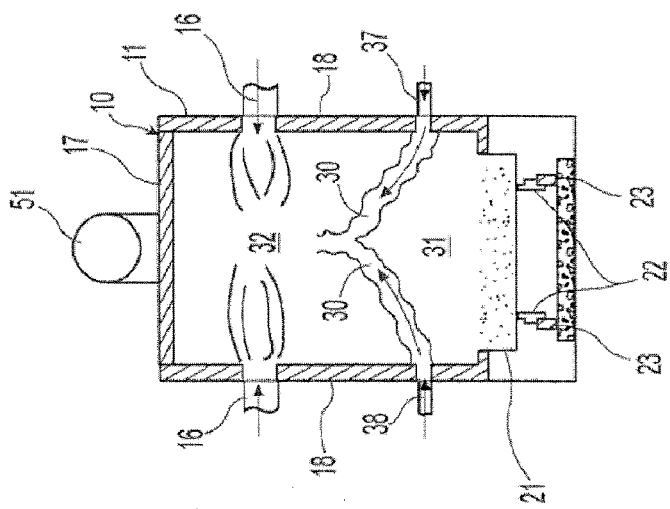
FIG. 1C is a cross-sectional view taken along line 1-1 of FIG. 1 illustrating a second alternative embodiment of a hearth furnace shown in FIG. 1.
Figure 1B:
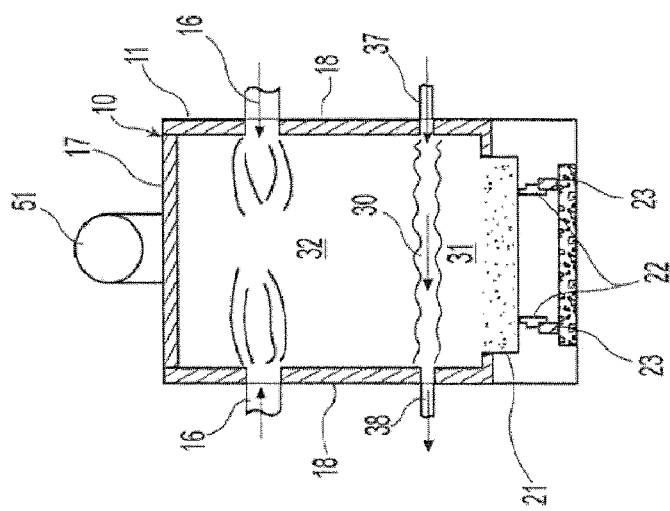
FIG. 1B is a cross-sectional view taken along line 1-1 of FIG. 1, illustrating a second alternative embodiment of a hearth furnace shown in FIG. 1.
Figure 1A:
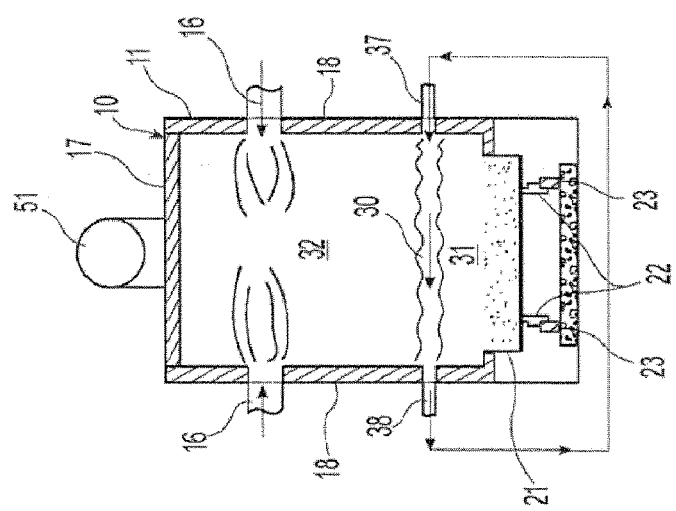
FIG. 1A is a cross-sectional view taken along line 1-1 of FIG. 1, illustrating an alternative embodiment of the hearth furnace shown in FIG. 1.

The heating of the reducible material in the conversion zone 13 and fusion zone 14 may be done by oxy-fuel burners 16 in the side wall 18 of the furnace housing 11 as shown in FIGS. 1, 1A, 1B and 1C. The oxy-fuel burners 16 are positioned to provide for efficient combustion of the volatilized materials in the conversion zone (as described in detail below) and to efficiently reduce the reducible material to metallic iron material in fusion zone 14. The oxy-fuel burners 16 should be positioned to provide for efficient heat transfer and efficient reduction of the iron oxide in the reducible material with the least energy consumption. The oxy-fuel burners 16 may be positioned on about 10 foot centers (about 3 m), staggered along opposite side walls 18, about a foot down from the roof 17 of the furnace housing 11. Alternatively, or in addition, the oxy-fuel burners may be positioned opposite each other in the side walls 18 (as shown in FIGS. 1A, 1B and 1C) and/or in the roof 17 of the furnace housing 11. In addition, oxygen lances 29 may be positioned in the roof 17 of the furnace housing 11 of the conversion zone 13 and the fusion zone 14 to provide additional energy for generation of heat and efficient conversion of the reducible material in the furnace.

Cooling zone 15 cools the metallic iron material from its formation temperature in the conversion zone 13 and fusion zone 14 to a temperature at which the metallic iron material can be reasonably handled and further processed. This temperature is generally about 500° F. (260° C.) or below. The cooling can be achieved by injection of nitrogen through nozzles 27 in the roofs and/or side walls of the furnace housing 11. Also, water spray may be used for the cooling in the cooling zone 15, if desired and provision made for water handling within the system.

Shown in FIG. 1, a separation barrier 30 is positioned in the conversion zone 13, separating the conversion zone into reducing region 31 adjacent the hearth 20 and combustion region 32 adjacent the reducing region 31 and spaced from the hearth 20.

In one embodiment, the separation barrier 30 may be comprised of closed spaced pipes 33, e.g., 2 foot on centers (about 0.6 m), positioned transverse between side walls 18, and supporting a plate or grate 34 as shown in FIG. 1. The plate or grate 34 may be made of silicon carbide or anther suitable refractory r ceramic material. In separation barrier 30, there may also be provided intermediately along its length and at its end gaps 35 and 36, respectively. The gaps are typically positioned to facilitate flow of the fluidized volatile material from the reducible material in the reducing region 31 to the combustion region 32 of the conversion zone 13, for efficient combustion of the volatiles to produce heat that can be transferred to the reducing region 31 and reducible material in the reducing region 31 of the conversion zone 13. To provide for this flow from the reducing region 31 to the combustion region 32, a flow is created through the atmosphere of the reducing region 31 in the direction of travel of the moving hearth 20, and in a part of the combustion region 32 in a direction counter to the direction of movement of the hearth through the furnace housing 11. The separation barrier 30 may be of a heat conductive material capable of conducting the heat generated in the combustion region 32 to the reducing region 31 to reduce the reducible material positioned on the hearth 20, or heat radiating material capable of absorbing heat form the combustion of the fluidized volatile material in the combustion region 32 and radiating heat into the reducing region 31 to reduce the reducible material, or both. The separation barrier may be made of silicon carbide or other such higher heat conductive refractory material.

Alternatively, the separation barrier 30 may be a gas curtain as shown in FIG. 1A or 1B. As shown in FIGS. 1A and 1B, the gas curtain forming the separation barrier 30 is a gas flow from one side wall of the furnace housing 11 (at 37) to the opposite side wall of the furnace housing 11 (at 38) in a transverse direction to movement of the hearth 20 through the furnace housing 11. The gas curtain forming the separation barrier may be either a closed system as shown in FIG. 1A, where the gas is continually re-circulated with gas supplements, or a single pass through system as shown in FIG. 1B where the gas enters through the side wall 18 of the furnace housing 11 at 37 and exits through the opposite side wall 18 of the furnace housing 11 at 38.

In another embodiment, the separation barrier 30 may be formed by a gas curtain simultaneously flowing from opposite side wall 18 of the furnace housing 11 at 37 and 38, but angled upwardly to flow transverse the direction of travel of the hearth 20 through the furnace housing 11. In this embodiment, the separation barrier 30 may be formed by the flow from oxy-fuel burners positioned in the side walls 18 of the furnace housing 11 at 37 and 38. Oxy-fuel burners (not shown) may be positioned at 37 and 38 a few inches above the reducible material on the hearth 20 as shown in FIGS. 1A, 1B and 1C. The gas curtain forming the separation barrier 30 may be comprised of a gas selected from the group consisting of nitrogen, carbon monoxide, combustion gas, effluent gas from the furnace or a mixture of two or more of these gases.

Figure 2:
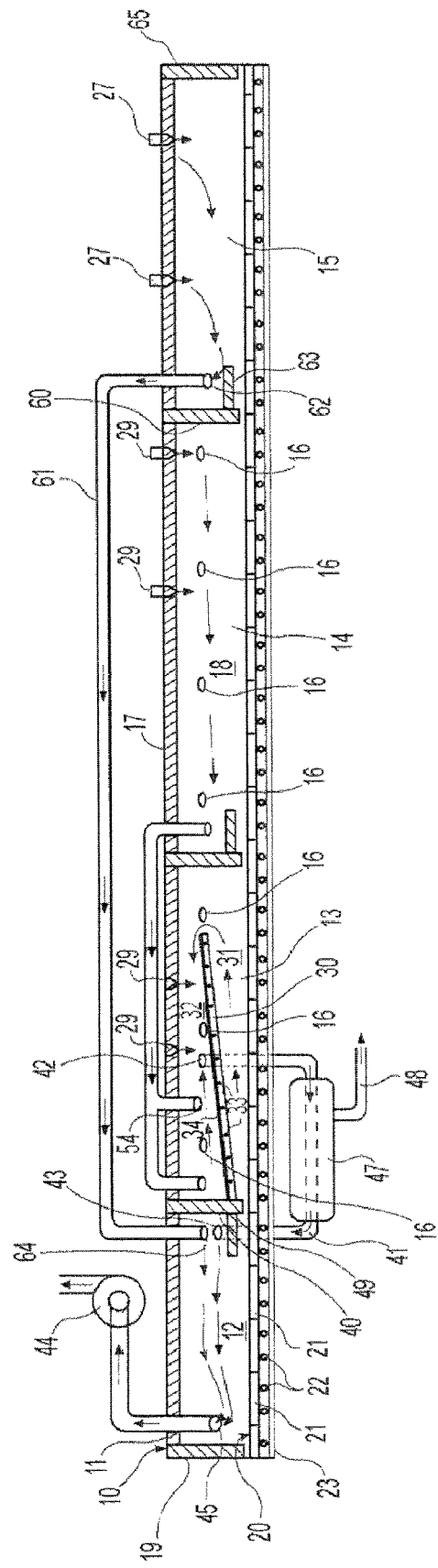
FIG. 2 is an elevation view illustrating an alternative embodiment of a hearth furnace for producing metallic iron material, and method of operation of the same.

Alternatively, or in addition to gaps 35 and 36, the separation barrier may be perforated, as with a grate for example, or otherwise discontinuous to allow for efficient flow of fluidized volatile material from the reducing region 31 into the combustion region 32 of the conversion zone 13. To provide for efficient flow of the volatile material fluidized in the reducing region 31 into the combustion region 32 of the conversion zone 13, the separation barrier 30 may also ascend upwardly in the direction of movement of the hearth 20 through the furnace 10. Such an ascending separation barrier may be as shown in FIG. 2 where the separation barrier is angled. Alternatively, the separation barrier 30 may be provided in ascending steps (not shown) to facilitate construction of an ascending separation barrier 30 in sections along the furnace housing 11. In any case, the separation barrier is ascending to allow for increased volume of fluidized volatile material in the reducing region 31 as the temperature increased in the reducible material with the hearth 20 moving the reducible material through the conversion zone 13 of the furnace.

To provide for the flow of fluids in the combustion region 32 of the conversion zone 13, a first baffle 40 is provided between drying/preheat zone 12 and conversion zone 13. This first baffle 40 is capable of inhibiting direct fluid communication between the atmosphere of the conversion zone 13 and the atmosphere of the drying/preheat zone 12. First baffle 40 may be made of a suitable refractory material, such as silicon carbide, and may extend downwardly to within a few inches of the reducible material on the hearth 20. The design is to provide for efficient inhibiting of the direct fluids communication between the conversion zone 13 and the drying/preheat zone 12 in the furnace 10, without interfering with movement of reducible material on hearth 20 through furnace housing 11.

A first communication passageway 41 is also provided and capable of carrying fluids from the combustion region 32 of the conversion zone 13 to the drying/preheat zone 12. The first communication passageway 41 may be a chamber or chambers laterally positioned in the side(s) of the furnace housing 11 with a double refractory wall, or ducting which extends through the side(s) of the furnace housing 11 as shown in FIG. 1.

The inlet 42 to first communication passageway 41 is located to provide for efficient combustion of the fluidized volatile material in combustion region 32, and to efficiently move the combusted fluids from the combustion region 32. The flow through first communication passageway 41 also is to facilitate flow of volatile fluids from the reducing region 31 to the combustion region 32, to provide flow of the fluidized volatile material within the reducing region 31 in the direction of travel of hearth 20 through the furnace housing 11, and to provide for flow of the fluidized volatile material and combusted fluids through the combustion region 32 counter to the direction of travel of the hearth 20 through the furnace housing 11 to facilitate flow from the outlet 43 of the first communication passageway 41. For efficient use of the transported fluids in the drying/preheat zone 12, to provide for efficient heat transfer in drying/preheating the reducible material, a process fan 44 is provided with its inlet 45 adjacent the entrance baffle 19 of the reducible material on the health cars 21 into the furnace 10. The outlet 43 of first communication passageway 41 is provided adjacent the first baffle 40, and near the reducible material, to provide for efficient use of the fluid flow from passageway 41 in drying and preheating the reducible material in drying/preheat zone 12. To provide flow of the fluid through drying/preheat zone 12 counter to the movement of the hearth 20 through the furnace housing 11, a generally horizontal baffle 49 may extend from first baffle 40 into the drying/preheat zone 12 to direct flow of the fluid from outlet 43 of first communication passageway 41 through the drying/preheat zone 12, to efficiently transfer heat from the transported fluid to dry and preheat the reducible material on the hearth 20.

The temperature of the combusted fluids through first communication passageway 41 is generally too high for effective use of the drying/preheat zone 12. For this reason, a temperature controller 47 is positioned in first communication passageway 41 and is capable of controlling the temperature of the fluid flowing from the combustion region 32 of the conversion zone 13 to the drying/preheat zone 12. The temperature controller 47 may cool the fluid transported through first communication passageway 41 by mixing with a cooling gas such as tempering air or nitrogen transported from cooling zone 15. Alternatively, the temperature controller 47 may be in the form of a heat exchanger capable of controlling the temperature of the fluid flowing through first communication passageway 41 by extracting and recovering heat from the fluid flow in the first communication passageway 41. The extracted and recovered heat may be transferred to a secondary fluid in the heat exchanger 47 and transferred by a duct 48 to a heater (not shown) capable of heating gas supplied to the burners 16 in the combustion region 32 and the fusion zone 14, or the gas supplied to burners 16 may be heated directly in heat exchanger 47.

A second baffle 50 is provided either between conversion zone 13 and fusion zone 14 or part way into fusion zone 14. Second baffle 50 is capable of inhibiting direct fluid communication between the atmosphere of the part of the fusion zone 14 downstream of the baffle to the atmosphere of the conversion zone 13. The second baffle 50 may be a refractory material, such as silicon carbide, and extend to within a few inches of the reducible material positioned on the hearth 20 as it moves through the furnace housing 11, to effectively inhibit the direct fluid communication across the second baffle 50.

A second communication passageway 51 is also provided capable of carrying fluid from the fusion zone 14 to the combustion region 32 of the conversion zone 13 adjacent the first baffle 40 as shown in FIG. 1. The inlet 52 to second communication passageway 51 is positioned in fusion zone 14 downstream of second baffle 50 to provide flow of fluid through the fusion zone counter to the travel of the hearth 20 through fusion zone 14. This provides for efficient transfer of the heat in reducing and melting of the metallic iron material in the fusion zone 14. For this purpose, a horizontal baffle 53 of refractory material may extend from second baffle 50 downstream into the fusion zone 14 to facilitate the counter current flow of fluid through the fusion zone and avoid turbulence in the vicinity of the reducible material as it passes under second baffle 50. The outlets 54 from second communication passageway 51 into the combustion region 32 of conversion zone 13 may be distributed as shown in FIG. 1 for more effective transfer of heat from the fluids transported from the fusion zone 14 to the combustion region 32 for their efficient use in combusting fluidized volatile material and produce heat assist in reducing the reducible material in the reducing region 31.

The cooling zone 15 is optional, since it may be desired in certain embodiments to perform the cooling of the metallic iron material outside the furnace housing 11 to reduce furnace costs and other considerations. Alternatively, a third baffle 60 may be provided between the fusion zone 14 and the cooling zone 15. Third baffle 60 is capable of inhibiting direct fluid communication between the atmosphere of at least part of the cooling zone 15 and the atmosphere of the fusion zone 14. The third baffle 60 may be made of a refractory material, such as silicon carbide, and may extend to within a few inches of the reducible material positioned on the hearth 20 as reducible material moves through the furnace housing 11. The third baffle 60 together with third communication passageway 61 provides for efficient movement of fluid through the atmosphere of cooling zone 15 counter to the direction of travel of the hearth 20, through the furnace housing, and to extract heat from the metallic iron material in the cooling zone 15 for use in the drying/preheat zone 12 to dry and preheat the reducible material. Third communication passageway 61 is positioned downstream adjacent third baffle 60, with inlet 62 positioned adjacent third baffle 60, and a horizontal baffle 63 extends from third baffle 60 to efficiently direct the flow of fluid through the cooling zone 15. The outlet 64 from the third communication passageway 61 is adjacent the first baffle 40. Alternatively, if desired, all or part of the fluid flow through the third communication passageway 61 may be directed to temperature controller 47 in first communication passageway 41 and mixed with a fluid flow through communication passageway 41 to lower and control the temperature of that fluid flow.

Both second communication passageway 51 and third communication passageway 61 may be provided in lateral chambers as part of the furnace housing 11 or by separate ducting through the roof 17 or side walls 18 of furnace housing 11. In either case, these communication passageways should be insulated so as to minimize the loss of heat and to provide for efficient transfer of heat from one part of the furnace 10 to another, and in turn increase the efficiency of the furnace 11 in reducing the iron oxide to metallic iron (while efficiently combusting volatiles from the reducible material to heat the reducible material in the conversion zone 13).

The exit end of the hearth furnace 10, at the cooling zone 15, is closed by a restricting baffle 65 that inhibits fluid flow between the outside ambient atmosphere and the atmosphere of the cooling zone 15, yet provides clearance so as not to inhibit the movement of reducible material out the furnace housing 11. The baffle 65 may be made of a suitable refractory material or a metal material if the temperatures are sufficiently low.

Figure 3:
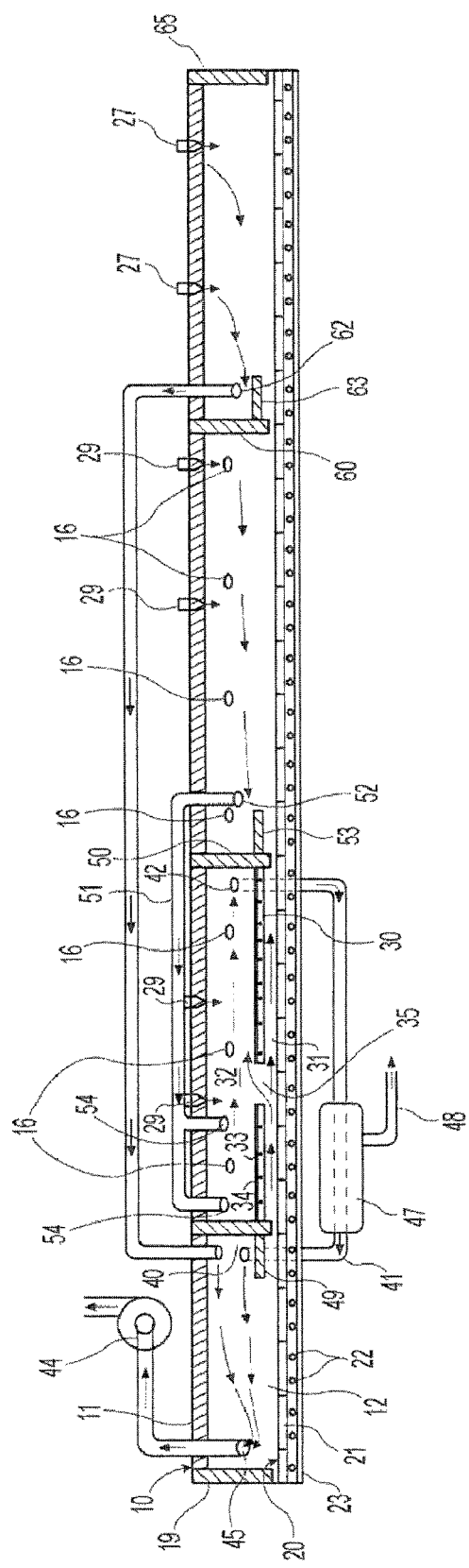
FIG. 3 is an elevation view illustrating a further alternative embodiment of a hearth furnace for producing metallic iron material, and method for operation of the same.

FIG. 3 illustrates an alternative embodiment of the moving hearth furnace 10 with the same components as described above with reference to FIGS. 1 and 2, except the separation barrier 30 extends to second baffle 50 so there is no gap 36 at the end of the separation barrier 30. In this embodiment, inlet 42 to first communication passageway 41 is located in the combustion region 32 adjacent the second baffle 50 for efficient removal of the combusted volatiles from the combustion region 32. Flow of fluidized volatile material through the forepart of reducing region 31, through intermediate gap 35, and through the latter part of the combustion region 32 is in a "S" shape. The volatiles fluidized in the reducing region 31 downstream of intermediate gap 35 may, depending on the pressure drops, either flow countercurrent the direction of movement of the hearth 20 through the reducing region 31 and through the intermediate gap 35, or under the second baffle 50 where the fluidized volatile material are collected through inlet 52 of the second communication passageway 51 along with the other volatile from fusion zone 14 and circulated through second passageway 51 to the combustion region 32 adjacent the first baffle 40. There these fluidized volatile material are combusted in the combustion region 32 along with the other fluidized volatile material transported though the intermediate gap 35 from the reducing region 31.

Figure 4:
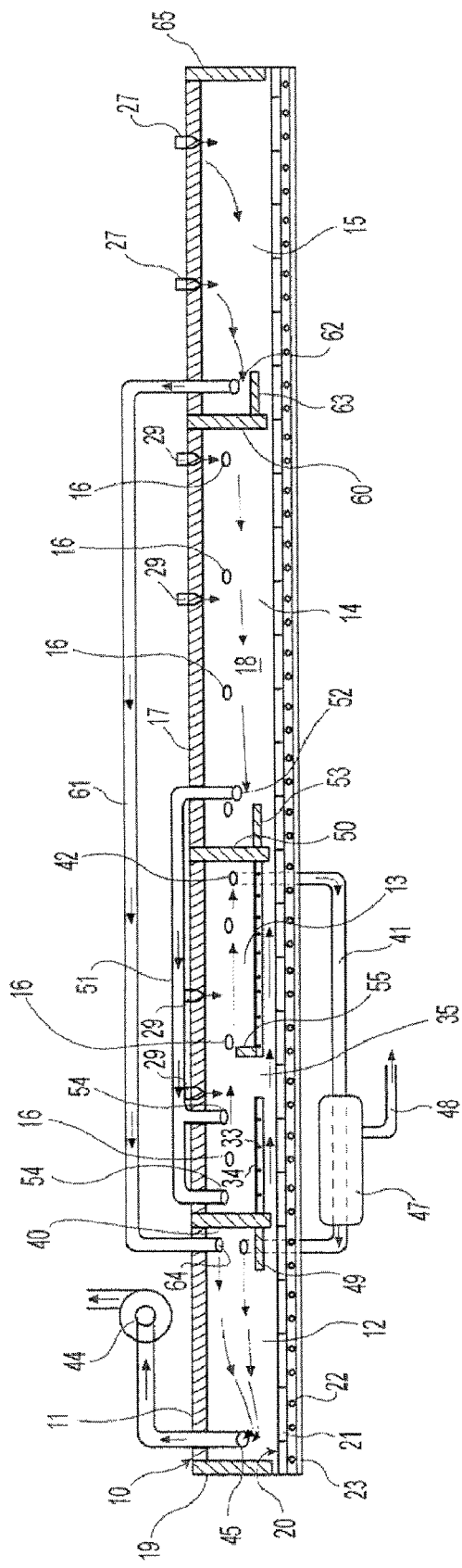
FIG. 4 is an elevation view illustrating a further alternative embodiment of a hearth furnace for producing metallic iron material, and method for operating the same.

As an additional feature, as shown in FIG. 4, weir 55 may be positioned contiguous with the separation barrier 30 adjacent intermediate gap 35. Weir 55 inhibits direct flow of fluidized volatile materials from the reducing region 31 through intermediate gap 35 into the combustion region 32 adjacent second baffle 50, while allowing these fluidized volatile material to flow over weir 55 into that area of the combustion region 32. This embodiment provides for increased mixing of fluidized volatile material in the combustion region 32 adjacent the second baffle 50 for more efficient combustion of these volatiles, and in turn transfer of increased heat of combustion to more efficiently reduce the iron-oxide bearing material in the reducing region 31 downstream of gap 35.

Figure 5:
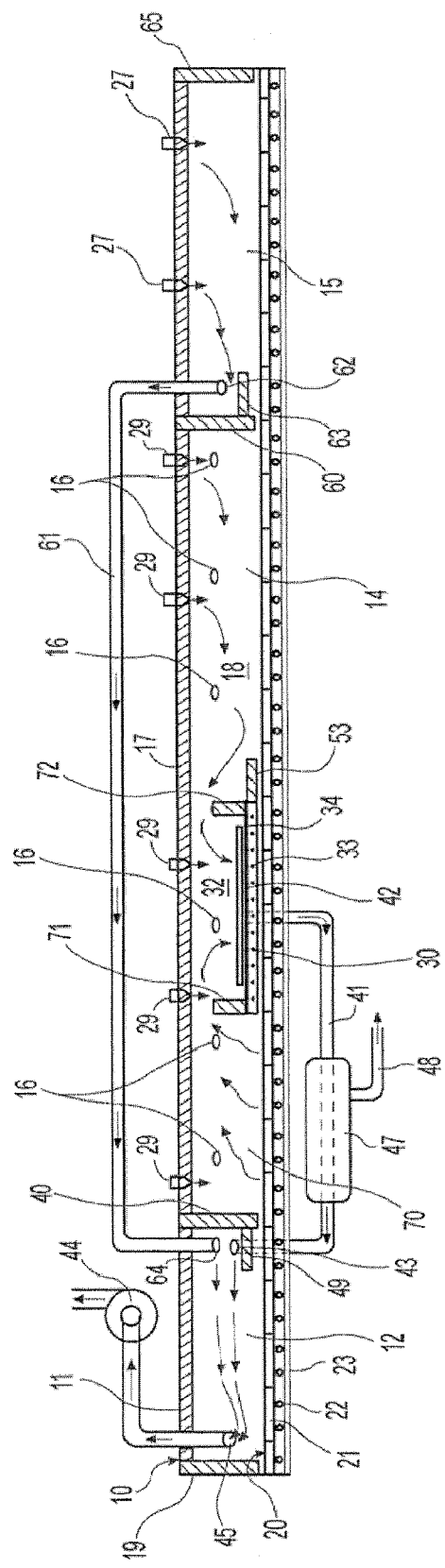
FIG. 5 is an elevation view illustrating a further alternative embodiment of a hearth furnace for producing metallic iron material, and method for operation for the same.
Figure 6:
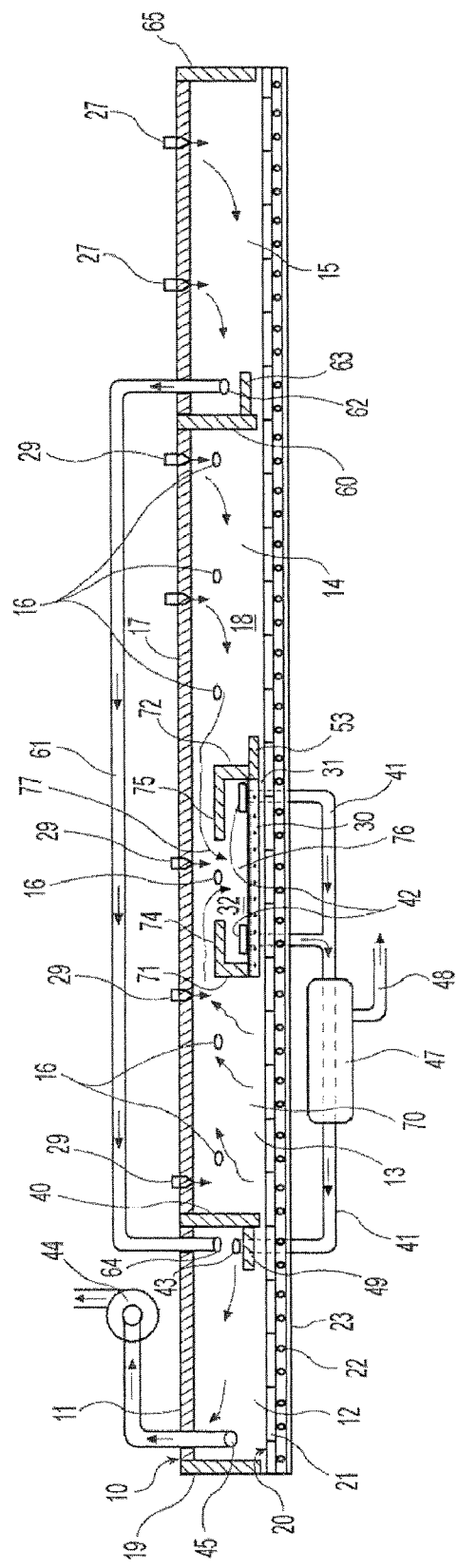
FIG. 6 is an elevation view illustrating a further alternative embodiment of a hearth furnace for producing metallic iron material, and method for operation for the same.
Figure 7:
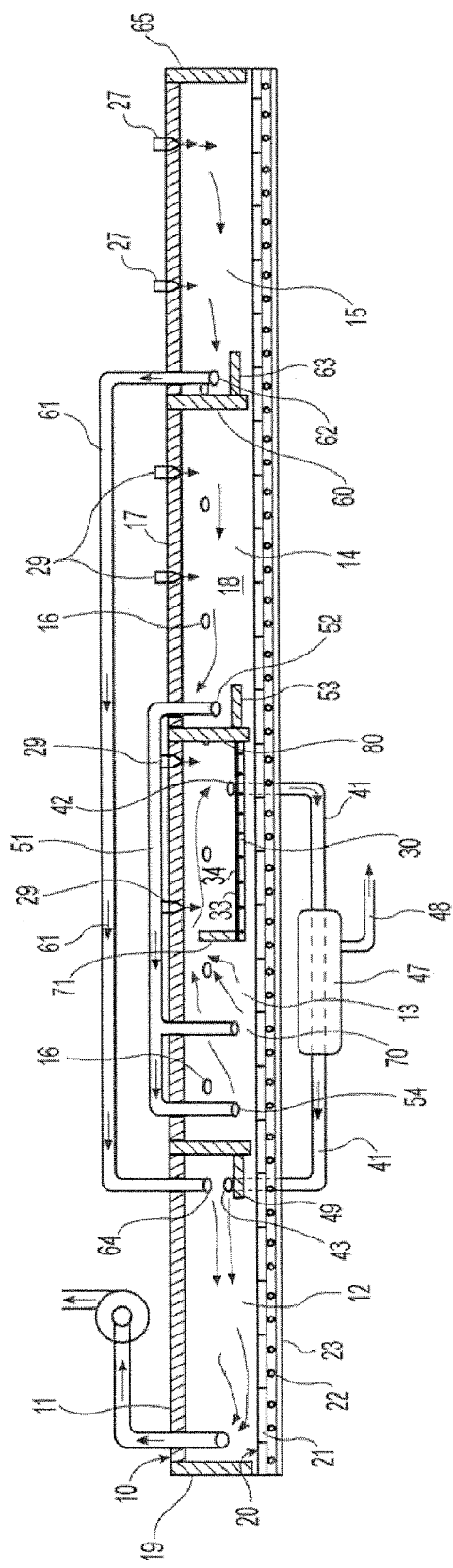
FIG. 7 is an elevation view illustrating a further alternative embodiment of a hearth furnace for producing metallic iron material, and method for operation for the same.

FIGS. 5, 6 and 7 illustrate alternative embodiments of the furnace 10 with the same components as described above with reference to FIGS. 1 and 2, except for the arrangement of the separation barrier 30 and elimination or modification of the second baffle 50 between the conversion zone 13 and the fusion zone 14. In the embodiment shown in FIGS. 5, 6 and 7, the separation barrier 30 is positioned spaced from first baffle 40 by space 70 between first baffle 40 and separation barrier 30, where volatilizable materials associated with the reducible materials are more likely to fluidize in the conversion zone.

In the embodiment shown in FIG. 5, a first weir 71 is positioned contiguous with the separation barrier 30 so that it is capable of inhibiting direct fluid communication between the atmosphere of the conversion zone 13 not covered by the separation barrier 30, at 70, and the atmosphere of the combustion region 32 adjacent at least the portion of the separation barrier 30, while allowing fluidized volatile materials to flow over the first weir 71. The volatilizable material on the hearth 20 is more likely to already be fluidized in area 70 before the hearth moves under separation barrier 30. In addition, a second weir 72 is positioned contiguous with the separation barrier 30 and capable of inhibiting direct fluid communication between the atmosphere of the fusion zone 14, not covered by the separation barrier 30, and the atmosphere of the combustion region 32 adjacent at least a portion of the separation barrier 30, while allowing fluid to flow over the second weir 72 from the fusion zone 14 into the combustion region 32. The inlet 42 to the first communication passageway 41 is positioned in the side wall 18 of the furnace housing 11, preferably in the form of a plenum to carry fluid from the atmosphere of combustion region 32 of the conversion zone 13 between first and second weirs 71 and 72 to the atmosphere of the drying/preheat zone adjacent first baffle 40 as shown in FIG. 5. To facilitate the flow of fluid countercurrent to the direction of movement of the reducible material on hearth 20 in the fusion zone 14, second weir 72 may be offset from the end of the separation barrier 30 as shown by 53 in FIG. 5.

In an alternative to the embodiment discussed above shown in FIG. 7, the second weir 72 is replaced by a second baffle 80 that extends from the roof of the furnace housing 111 to the separation barrier 30 as shown in FIG. 7. In this embodiment, the inlet 42 to the first communication passageway 41 is positioned through the side of the furnace housing 11, for more efficient burning of the transported fluidized volatile materials from the reducible material in the conversion zone 13 at 70, where the separation barrier 30 is not positioned over the hearth 20.

In another alternative embodiment shown in FIG. 6, weirs 71 and 72 have extensions 74 and 75 extending toward each other to form a partially enclosed volume 76 of a portion of the combustion region 32 above separation barrier 30 into which fluidized volatile material can flow from space 70 of the conversion zone 13 and fluid from the fusion zone 14 can flow through opening 77. In this embodiment, the burners 16 for combusting the transported fluids in the combustion region 32 are located adjacent the opening 77, either in roof 17 or side walls 18 of furnace housing 11, and the inlets 42 into first communication passageway 41 are positioned in the sides of the furnace housing 11 within the partially enclosed volume 76. In this embodiment, inlets 42 are provided in the enclosed volume 76 spaced from the opening 77 for efficient combustion of fluidized volatile material in combustion region 32, for heating the reducible material in reducing region 31, and efficient transport of the combusted fluids from the combustion region 32 to the drying/preheat zone 12.

While the invention has been illustrated and described in detail in the foregoing drawings and description, the same is to be considered as illustrative and not restrictive in character, it being understood that only illustrative embodiments thereof have been shown and described, and that all changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. A method of reducing iron ore and other iron sources comprising:
    forming a furnace housing having a drying/preheat zone capable of providing a drying/preheat atmosphere for reducible material, a conversion zone capable of providing a reducing atmosphere for reducible material, and a fusion zone capable of providing an atmosphere to at least partially reduce iron material, the conversion zone being positioned between the drying/preheat zone and the fusion zone,
    providing a hearth capable of being movable within the furnace housing in a direction through the drying/preheat zone, then the conversion zone, and then the fusion zone,
    providing a separation barrier within at least a portion of the conversion zone, the fusion zone or both, separating the atmospheres of the conversion zone or the fusion zone where the separation barrier is located in a combustion region and a reducing region, with the reducing region adjacent the hearth and the combustion region adjacent the reducing region and spaced from the hearth, and
    moving the hearth containing iron bearing material and carbonaceous material in the furnace housing through the drying/preheat zone to dry and preheat the iron bearing material and carbonaceous material, then through the reducing region of the conversion zone to heat the iron bearing material and carbonaceous material to fluidize volatilizable material from the iron bearing material and carbonaceous material and at least partially reduce the iron bearing material, and then through the fusion zone to fuse the reduced iron bearing material to metallic iron material.

2. The method of reducing iron ore and other iron sources as claimed in claim 1 where in addition a weir is positioned in the combustion region to inhibit direct flow of fluid from the reducing region to the combustion region adjacent a baffle, while allowing flow of fluid over the weir into the combustion region adjacent the baffle.

3. The method of reducing iron ore and other iron sources as claimed in claim 1 further comprising:
    causing fluid from the atmosphere of the fusion zone to flow through a communication passageway to the atmosphere of the combustion region of the conversion zone adjacent the drying/preheat zone.

4. The method of reducing iron ore and other iron sources as claimed in claim 1 further comprising:
    causing fluid from the atmosphere of the combustion region of the conversion zone to flow through a first communication passageway from the atmosphere of the combustion region of the conversion zone to the drying/preheat zone, and
    causing fluid from the atmosphere of the fusion zone to flow through a second communication passageway to the atmosphere of the combustion region of the conversion zone adjacent the drying/preheat zone.

5. The method of reducing iron ore and other iron sources as claimed in claim 1 further comprising:
    causing flow of fluid at least part way through the atmosphere of the combustion region of the conversion zone in a direction counter to the direction of the travel of the hearth and of fluid at least part way through the atmosphere of the reducing region of the conversion zone in a direction concurrent to the direction of travel of the hearth.

6. The method of reducing iron ore and other iron sources as claimed in claim 1 further comprising:
    providing a gap or perforations in the separation barrier to facilitate flow of fluid from the atmosphere of the reducing region to the atmosphere of the combustion region of the conversion zone, facilitate flow of fluid at least part way through the atmosphere of the combustion region of the conversion zone in a direction counter to the direction of the movement of the hearth, and facilitate flow of fluid at least part way through the atmosphere of the reducing region of the conversion zone in a direction concurrent to the movement of the hearth.

7. The method of reducing iron sources as claimed in claim 1 further comprising:
    causing volatile material from the iron oxide bearing material and carbonaceous material in the atmosphere of the reducing region of the conversion zone to flow into the atmosphere of the combustion region of the conversion zone, and
    combusting said volatile material in the atmosphere of the combustion region of the conversion zone to at least partially heat the iron oxide bearing material and carbonaceous material in the reducing region of the conversion zone.

* * * * *

UNITED STATES PATENT AND TRADEMARK OFFICE
CERTIFICATE OF CORRECTION

PATENT NO. : 8,177,880 B2  
APPLICATION NO. : 12/444505  
DATED : May 15, 2012  
INVENTOR(S) : David Englund et al.

Page 1 of 1

It is certified that error appears in the above-identified patent and that said Letters Patent is hereby corrected as shown below:

Column 15, line 48, "furnace 11" should read --furnace 10--.
Column 17, line 6, "furnace housing 111" should read --furnace housing 11--.

Signed and Sealed this
Eighteenth Day of September, 2012

David J. Kappos
*Director of the United States Patent and Trademark Office*